(12) United States Patent  (10) Patent No.: US 8,601,588 B1
Black et al.  (45) Date of Patent: Dec. 3, 2013

(54) METHOD AND SYSTEM FOR DETECTION OF CLONE AUTHENTICATOR

(75) Inventors: Robert Black, Brookline, MA (US); William Duane, Westford, MA (US); Robert S. Philpott, Andover, MA (US)

(73) Assignee: EMC Corporation, Hopkinton, MA (US)

( * ) Notice: Subject to any disclaimer, the term of this patent is extended or adjusted under 35 U.S.C. 154(b) by 70 days.

(21) Appl. No.: 13/173,726

(22) Filed: Jun. 30, 2011

(51) Int. Cl.
*G06F 11/00* (2006.01)

(52) U.S. Cl.
USPC .......................................................... 726/25

(58) Field of Classification Search
USPC .................................. 726/16, 21, 25; 713/168
See application file for complete search history.

(56) References Cited

U.S. PATENT DOCUMENTS

2009/0271860 A1* 10/2009 Nonaka et al. ................... 726/16

OTHER PUBLICATIONS

Arvind Seshadri, Using Software-based Attestation for Verifying Embedded Systems in Cars, Carnegie Mellon University.*

* cited by examiner

*Primary Examiner* — Samson Lemma
(74) *Attorney, Agent, or Firm* — BainwoodHuang

(57) ABSTRACT

A method includes engaging in authentication operations each involving apparent use of a legitimate authenticator. Values of one or more authenticator variables are received and stored, where the authenticator variable(s) normally change in a known authenticator-specific way during the authentication operations, such as being calculated from a monotonically increasing dynamic variable. A risk analysis function is applied to the stored values to generate a risk indicator signal indicating a level of risk that the clone authenticator is in use. The risk analysis function includes detection of an abnormal change of the authenticator variable(s), such as use of non-monotonic dynamic variable values. The risk indicator signal is output to an access controller that operates, based on the level of risk indicated by the risk indicator signal, to selectively inhibit an otherwise successful authentication operation involving apparent use of the legitimate authenticator.

24 Claims, 2 Drawing Sheets

METHOD AND SYSTEM FOR DETECTION OF CLONE AUTHENTICATOR

BACKGROUND

The invention relates to the field of data security, and more particularly to the field of user authentication in data processing systems.

In data processing systems it is known to employ authentication devices, sometimes referred to as "tokens", as part of an authentication operation by which a user becomes authenticated to the system and given access to system resources. The token may be a specialized portable device using either specialized circuitry or specially programmed processing circuitry, or in some cases it may be realized in a generic hardware device (e.g., personal computing device such as PC or smartphone) using special token software that is executed to provide the token functionality. Typically the token includes a secret value that is used as an encryption key or similar constituent of a calculation that generates authentication codes that are provided to the system to authenticate the user. The system has corresponding functionality, perhaps including the same secret value or an associated secret value that can be used in a calculation to confirm that an authentication code received from the user was generated by an authenticator registered to the user, indicating that the user is authenticated and properly identified to the system. The use of authentication devices is one example of so-called "multi-factor" authentication used for enhanced security. Beyond the usual factor of a password or similar item known by the user, the presentation of a valid authentication code also indicates that the user is in possession of a valid authenticator, providing further confidence that the user is who he/she purports to be.

SUMMARY

In systems employing authentication devices such as described above (also referred to herein as "authenticators"), there is a possibility that a fraudster who is not authorized to use the system can duplicate or "clone" a legitimate user's authenticator in whole or relevant part, enabling the fraudster to obtain unauthorized access to the system by masquerading as the known user. Cloning may be achieved in a variety of ways, all including at least the copying of the secret that is used in the calculation that generates authentication codes. If a clone can sufficiently mimic the behavior of a legitimate authenticator, then its use may generally not be distinguishable from use of the legitimate authenticator, and the unauthorized system access may go undetected.

It is generally desirable that a system take measures to guard against the use of cloned authenticators for user authentication, so as to reduce the possibility of unauthorized system access and potential problems associated therewith.

A method and system are disclosed of operating a data processing system to respond to potential use of a clone authenticator capable of mimicking behavior of a legitimate authenticator known to an authentication system of the data processing system. The method and system detect patterns of authentication operations that indicate the possible use of a clone authenticator, and include this information in controlling access to the system. The technique can be incorporated as an additional feature into systems using risk-based authentication to increase system data security accordingly.

The disclosed method includes engaging in a series of authentication operations at the authentication system, where each authentication operation involves apparent use of the legitimate authenticator based on an authenticator identifier that is supplied to the authentication system as part of each operation. During each authentication operation, values of one or more authenticator variables are received and stored by the authentication system. The authenticator variable(s) normally change in a known authenticator-specific way during the series of authentication operations. For example, the authentication codes may be generated partly based on an event counter that is known to increase in value for successive authentication operations.

A risk analysis function is applied to the stored values of the authenticator variable(s) to generate a risk indicator signal indicating a level of risk that the clone authenticator is in use. The risk analysis function includes detection of an abnormal change of the authenticator variable(s) during the series of authentication operations. Continuing with the above example, such an abnormal change might be a pattern of values that are not consistently increasing over successive uses, i.e., an authentication operation might be based on an event count that is less than a higher event count already used for a preceding authentication operation, a condition that should not normally occur.

The risk indicator signal is output to an access controller that operates, based on the level of risk indicated by the risk indicator signal, to selectively inhibit an otherwise successful authentication operation involving apparent use of the legitimate authenticator. In some cases, use of a clone authenticator may be indistinguishable from use of the legitimate authenticator except for the above-described risk-based checking, and thus in the absence of such checking an authentication operation using the clone authenticator might succeed and provide unauthorized system access. The use of the risk analysis and risk indicator signal provide additional information that can prevent an authentication operation from succeeding and prevent the unauthorized access.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
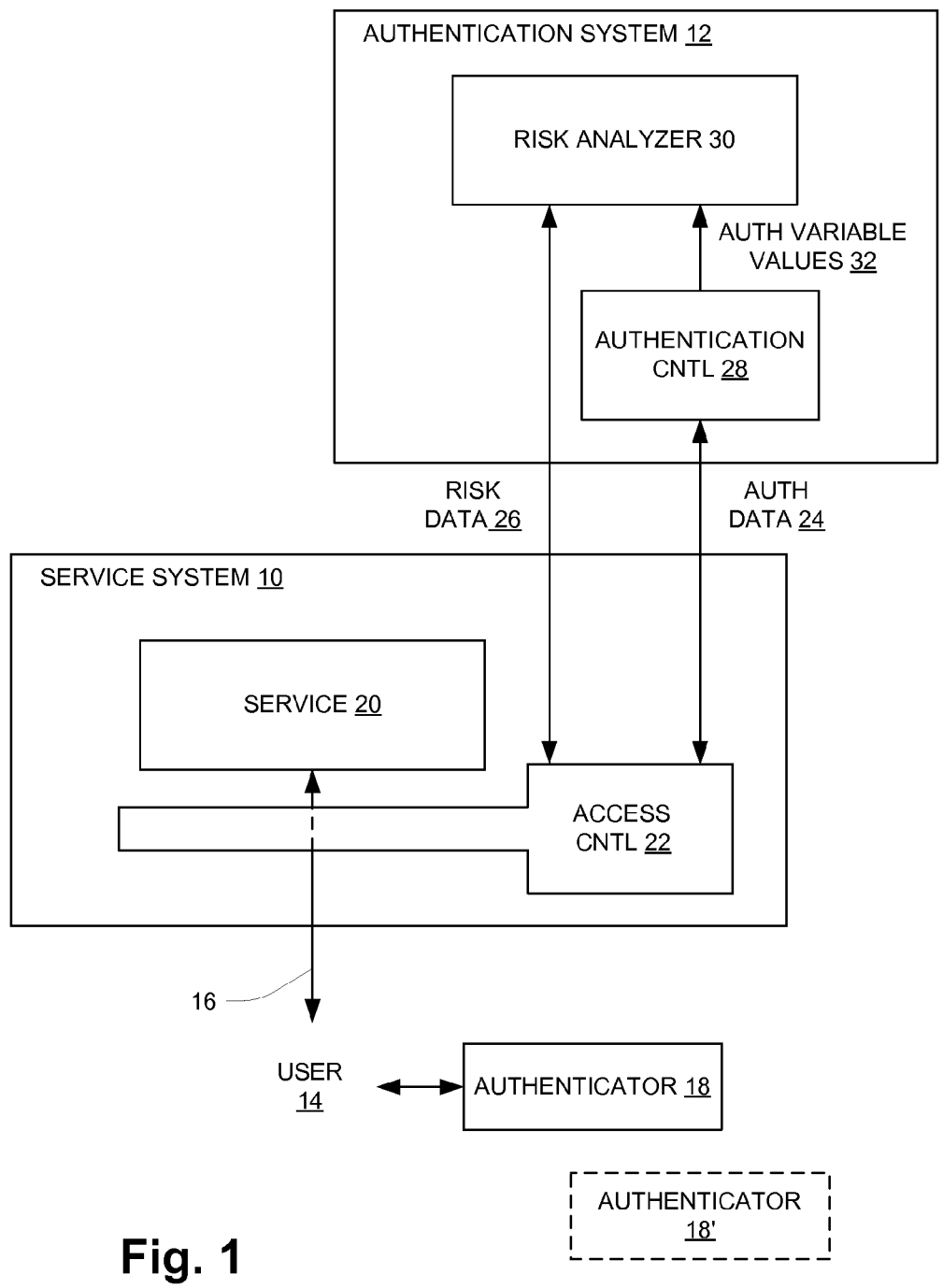
FIG. 1 is a block diagram of a data processing system.

FIG. 1 shows a data processing system including a service system 10 and an authentication system 12. The service system 10 is typically a collection of one or more servers running application program(s) providing data processing services to one or more users 14 via user connections 16. The data processing services may be any of a variety of services including database services, file services, storage services, transaction services (electronic commerce), etc. The users 14 typically connect through some type of local terminal or computer, not shown in FIG. 1, such as a personal computer, mobile computing device (e.g., smartphone), or specialized merchant terminal. The user 14 has access to an authenticator 18 used for authenticating the user 14 to the service system 10 as described in more detail below. The authentication system 12 provides authentication services to the service system 10 by which users 14 are authenticated as part of allowing the users 14 to access and utilize the service system 10. The service system 10 and authentication system 12 may or may not be under common administrative control and may or may not be co-located (either in whole or in part).

As shown, the service system 10 includes one or more data processing services 20 and one or more access controllers (ACCESS CNTL) 22, these items generally being referred to in the singular herein for ease and clarity and with no loss of generality intended. The access controller 22 functions as an intermediary between the users 14 and the service 20, as indicated by the dotted portion of the connection 16 passing through the access controller 22. The service 20 includes program code, data, and connectivity that carry out a service such as those described above (database service, etc.), while the access controller 22 includes program code, data and connectivity that control whether and how the users 14 are permitted to access and use the service 20. As shown, the access controller 22 includes connections to the authentication system 12 for exchange of authentication data 24 and risk data 26, used as described below. These connections, as well as the user connections 16, may be realized in any of a variety of known ways, including as switched/routed sessions in one or more private and/or public data networks including Internet Protocol (IP) networks.

The authentication system 12 includes an authentication controller 28 and a risk analyzer 30, with connections between these components and to the access controller 22 of the service system 10 as shown. In operation, the authentication controller 28 provides certain authentication-related data (AUTH VARIABLE VALUES) 32 to the risk analyzer 30 for use in generating the risk data 26 provided to the access controller 22, as described more fully below.

The data processing system of FIG. 1 utilizes multi-factor authentication, and specifically may use so-called one-time-password or OTP technology of the type generally known in the art. The user 14 is typically known to the service system 20, and the access controller 22 may require use of a user identifier and confidential password or personal identifier number (PIN) to permit user access in a conventional fashion. Additionally, there is a requirement for the user 14 to provide a one-time password generated by the authenticator 18 and operated upon by the authentication controller 28. The OTP functionality represents a second authentication factor which is based on the user's possession of the authenticator 18 that contains a secret which is known only to the authentication controller 28. In one embodiment, the authenticator 18 may be a hardware device known as a "token" of the type sold by RSA Security, Inc. under the trademark RSA SecurID®. More generally, the authentication controller 18 may be any of a variety of devices with circuitry, firmware and/or software that perform client-side OTP functions.

In operation, the user 14 controls the authenticator 18 to generate a one-time password, which is generated based on the secret while masking the secret itself, and this one-time password is sent to the authentication controller 28 along with information identifying the user 14 and/or authenticator 18. The authentication controller 28 accesses its copy of the secret using the identifying information, performs the same OTP calculation as performed in the authenticator 18, and compares the resulting OTP with the OTP provided from the authenticator 18. A match between the values signifies that the user 14 is known to the system, and thus "authenticated", whereas a mismatch indicates otherwise. Information indicating the occurrence of a match or a mismatch is typically provided back to the access controller 22 where it is used as an input to a decision whether (and how) to permit the user 14 to access a service controller 20.

The authentication controller 28 also provides information from authentication operations, such as the above-described operation of authenticating a user based on use of a correct OTP value, to the risk analyzer 30. The risk analyzer 30 operates to gather, maintain, and use a variety of information about actual and attempted use of the service system 10 to assess and control data security risks, operating in part by providing risk data 26 to the access controller 22 for use in decisions and other operations regarding user access to the service system 10. Risk analysis can be applied based on a variety of information including device information and user behavior information. For example, if a known user 14 attempts to access the system from a previously unknown computer or other device, the risk analyzer 30 can detect this situation and indicate a raised risk level in the risk data 26, perhaps prompting the access controller 22 to either deny access or to take additional action aimed at decreasing the risk that the user 14 is not who it is purporting to be. As another example, a user 14 may typically access a service controller 20 only at particular times such as normal work hours, and thus an attempted access at some other time can result in a raised risk level.

One of the risks in the system of FIG. 1 is the possibility of a "fraudster" (unauthorized person normally having some level of malicious intent) to improperly copy or "clone" the authenticator 18 and then obtain access to the service system 10 by masquerading as a known user 14 having access privileges. This situation is illustrated in FIG. 1 by a clone authenticator 18' as distinct from a legitimate authenticator 18 which is known to the authentication controller 28. Cloning may be done in any of a variety of ways, including (1) copying the entirety of an integrated circuit or other hardware circuitry that includes the stored secret, and (2) copying a stored image of authenticator software or firmware from a device programmed therewith. In some cases, it may be sufficient for a fraudster to obtain only the secret and to construct other functionality of a legitimate authenticator 18 from other generally known information. While use of cloning may be only one of many types of attacks, the detection and thwarting of clone usage is one additional security feature that can contribute to overall improved security. Additionally, where risk analysis may already be used in a system, it may be possible to add clone detection as described herein at little additional cost, so that the functionality may be well justified from a cost-benefit perspective.

In the system of FIG. 1, information about the use of authentication by a user 14 is included in the risk analyses performed by the risk analyzer 30. As described in more detail below, data values used in authentication operations over time are stored and used for detecting unusual authentication-related operating conditions that may signify increased risk. The inclusion of such risk information in the risk data 26 enables the service system 10 to prevent unauthorized access by use of a cloned authenticator 18', further enhancing system security.

Figure 2:
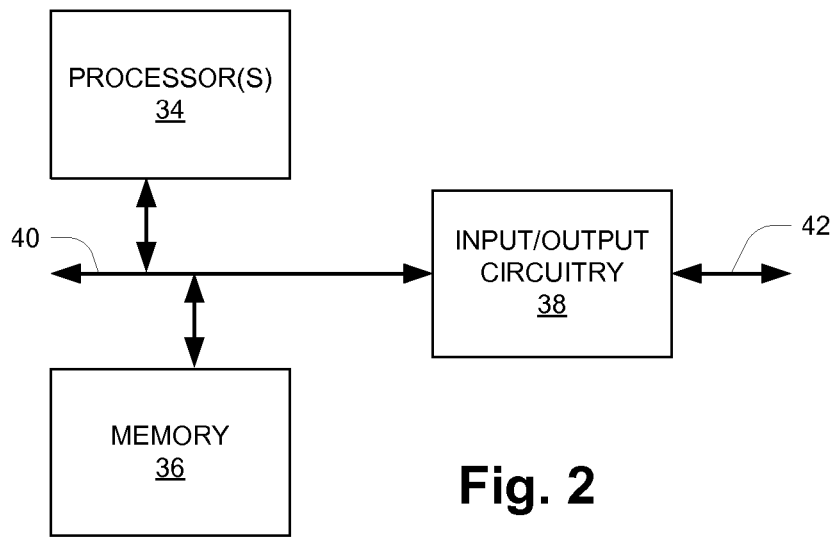
FIG. 2 is a block diagram of a computing device.

FIG. 2 is a generalized block diagram of processing circuitry such as may be used in any/all of the authenticator 18, computers within the service system 10, and computers within the authentication system 12, as well as other client-side components such as a personal computer of the user 14. The processing circuitry includes one or more processors 34, memory 36 and input/output circuitry 38 coupled together by interconnect 40 such as one or more high-speed data buses. The input/output circuitry 38 includes one or more connections 42 to external devices, such as to network devices, data storage devices, user interface devices, etc. In operation, the memory 36 contains program instructions which are accessed and executed by the processors 34, along with data used in the execution of the instructions. The processing circuitry executing sets of program instructions realizes corresponding components such as the service 20, access controller 22, authentication controller 28 and risk analyzer 30, as will be appreciated by those skilled in the art.

With respect to the service system 10 and authentication system 12, processing circuitry such as that of FIG. 2 may be distributed among one or more "server" computers as generally known in the art. In the authentication system 12 in particular, it may be beneficial to partition the functions of risk analyzer 30 and authentication controller 28 between different servers or sets of servers, due to the relative specialization of these functions as well as other considerations (specifically the sensitivity of the secrets maintained by the authentication controller 28).

As mentioned above, authentication operations may include generating a one-time password using an encryption function or other combination function using a secret value, a dynamic (time- or sequence-based) value, and perhaps other data. Authentication schemes can include the following:

Event based OTP: One time password based on an event counter that is monotonically increasing. Each code is generated by the secret value, an event count (e.g., from an event counter), and potentially other data. One convenient "event" to count is each use of the authenticator 18 for an authentication. This scheme is used for accessing a system with an authentication code that changes for each authentication. The event count is always monotonically increasing, which can be exploited for enhanced security as described below.

Time based OTP: One time password based on the exact time. Each code is generated by the secret value, a time value, and potentially other data. Used for accessing a system with an authentication code that changes for each authentication. The time is always monotonically increasing, a property that can be exploited for enhanced security as described more below.

Time and event based OTP: One time password based on an event counter and a time value. Each code is generated by the secret value, a time value, an event count, and potentially other data. This is also used for accessing a system with an authentication code that changes for each authentication.

Challenge/Response: A challenge value is provided to a user seeking access, who most generate and provide a valid response value that is calculated using the challenge code, a time and/or event value, the secret value, and potentially other data. This is used for accessing a system with an authentication code based on a dynamic system-generated challenge. Challenges are generated sequentially over a series of authentication operations and generally not reused, and this property can be exploited for enhanced security as described below.

One description of OTP authentication techniques is described in U.S. Pat. No. 7,363,494 by Brainard et al., entitled "Method and Apparatus for Performing Enhanced Time-Based Authentication", the contents of which are incorporated by reference herein.

An additional measure that can optionally be used with any of the above schemes is "transaction signing" based on a transaction occurring between the user and the service system 10 for which the authentication is being performed (e.g., a banking transaction or purchase transaction). In transaction signing, a number of details that are specific to a transaction are used to generate a code which is used to authorize a particular transaction. Response is based on a seed, the input, a time and/or event counter, and potentially other data.

As noted above, one aspect of time- and event-based OTP techniques is the use of a monotonically increasing (or more generally, monotonically changing) variable as an input to the combination function that generates an OTP authentication code. There can sometimes be uncertainty between the authenticator 18 and the authentication controller 28 of exactly which value of such a variable should be used for a given authentication, due for example to normal variation of time bases between these components, or the possibility that the event count in the authenticator 18 may have been advanced but not as part of an authentication operation that caused the event count to also change at the authentication controller 28. These uncertainties can be addressed by suitable techniques, generally known in the art, enabling the authentication controller 28 to synchronize itself to the authenticator 18. However, once a given time or event value has been used by an authenticator 18, it should never be used again. While this property is guaranteed for a given authenticator 18, it is not generally guaranteed across two separate authenticators 18. Two separate authenticators 18 will not be perfectly synchronized in time, nor will it generally be possible to synchronize their event counts. This is true even for a legitimate authenticator 18 and a clone 18'.

The above can be appreciated easily by imagining a series of event counts from a legitimate authenticator 18 and a clone authenticator 18'. The legitimate authenticator 18 has event count of 1 which is used at a first time $T_1$, and an event count of 2 used at a later time $T_3$. The clone authenticator 18' has an event count of 1 used at a time $T_2$ which is between $T_1$ and $T_3$. After performing an authentication operation at time T1 for the legitimate authenticator 18, the authentication controller 28 expects to see an OTP based on an event count of 2 for the next authentication. When it receives an OTP at T2 which was also generated using the event count of 1, this condition violates the expectation of monotonically increasing event count values, providing an indication that the authentication is not employing a legitimate authenticator 18 but rather a clone 18'. An analogous situation can occur with time-based OTP, in which the time value on which authentication is based appears to both increase and decrease over a series of authentications.

Figure 3:
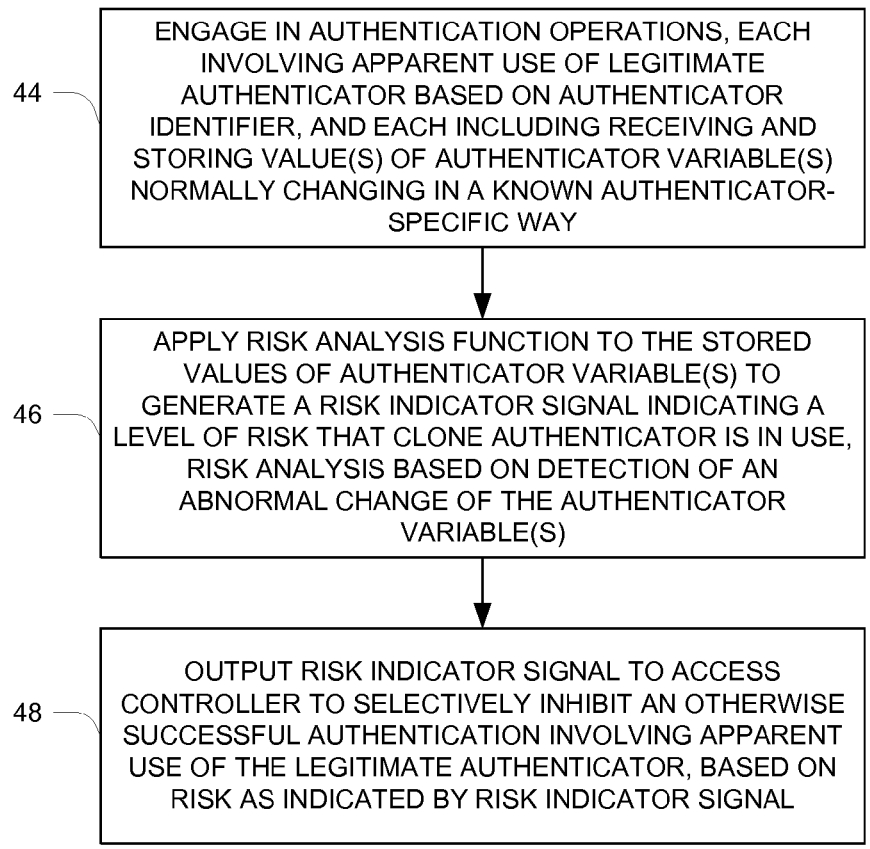
FIG. 3 is a flow diagram of a method of operating an authentication system.

FIG. 3 is a flow diagram description of certain operation of the data processing system of FIG. 1 aimed at detecting potential use of a clone authenticator 18' which is assumed to be capable of mimicking the behavior of a legitimate authenticator 18 that is known to the authentication system 12. That is, the clone authenticator 18' employs the same secret value and combination function used by the legitimate authenticator 18, and it can be identified to the authentication controller 28 as the legitimate authenticator 18 (e.g., by use of the same serial number or other authenticator identifier). If the clone authenticator 18' were used to the exclusion of the legitimate authenticator 18, it might not be detectable by the authentication controller 28. But concurrent use of the two authenticators 18, 18' causes certain authenticator variables that are provided to the authentication controller 28 to change in an unexpected way, providing a basis for detection of the clone 18'. In FIG. 3, operation is described from the perspective of the authentication system 12.

At 44, the authentication system 12 engages in a series of authentication operations, each involving apparent use of the legitimate authenticator 18. The authenticator 18 is identified by an authenticator identifier used in each authentication operation, being supplied to the authentication system 12 (specifically to the authentication controller 28) where it is used to access the authenticator-specific secret value as well as other information. As an example, a manufacturer's serial number assigned to an authenticator 18 may be used as an authenticator identifier. Each authentication operation includes receiving and storing corresponding value(s) of one or more authenticator variables that normally changes in a known authenticator-specific way during the series of authentication operations. Examples are discussed below. Storing the authenticator variable(s) over the series of authentication operation results in a set of stored values of the authenticator variable(s). In one embodiment the values are stored by the risk analyzer 30.

At 46, a risk analysis function is applied (by the risk analyzer 30) to the stored values of the authenticator variable(s) to generate a risk indicator signal indicating a level of risk that the clone authenticator 18' is in use. The risk analysis function includes detection of an abnormal change of the authenticator variable(s) during the series of authentication operations. Specific examples are discussed below.

At 48, the risk indicator signal is output to the access controller 22 which operates, based on the level of risk as indicated by the risk indicator signal, to selectively inhibit an otherwise successful authentication involving apparent use of the legitimate one-time-password authenticator. In the illustrated arrangement, the risk indicator signal is included in the risk data 26 provided to the service system 10. The function of selectively inhibiting authentications may be performed by the access controller 28, and may have several characteristics. One is the use of one or more thresholds for risk levels at which different actions may be taken, and another is the nature of the actions taken. As an example, in one simple scheme the risk indicator signal may be binary, indicating low risk in one binary signal state and high risk in the other. Similarly, the set of possible actions may also be binary, either allowing or denying access depending on whether the risk is low or high respectively. More complex schemes can be employed. In some embodiments the risk data 26 may reflect a many-valued risk "score" calculated by the risk analyzer 30 based on a number of factors including the analysis of step 46, and there may be a larger set of possible actions at the access controller 22 based on different values or ranges of the risk score.

The authenticator variable(s) used in step 44 is/are provided by the authenticator 18 (both legitimate and clone) during an authentication operation, and as indicated their value(s) is/are known to change in a certain way over a series of authentications. There are several types of variables that can be used. One type is the authentication code (e.g., OTP) itself, which has been generated using a dynamic value with expected sequential behavior. In some embodiments, a given code should never be used twice, either because it is generated based on a monotonically increasing value or it is part of a sequence of challenge/response pairs, each pair being used only once. The authentication system 12 may maintain the values of authentication codes that have been received over a recent time interval. During an authentication operation, an authentication code received from the authenticator 18 can be compared to the set of stored authentication codes, with a match indicating a violation of the expected sequentiality. To cover the case that a code might have been skipped in operation (permissible in some embodiments without causing authentication to fail), codes can be stored along with their corresponding input dynamic values (e.g., challenge/response values, times or event counts). During an authentication operation, the dynamic value that generates an authentication code being used for a current authentication operation can be compared with the stored dynamic values, and if the current value is found to precede one of the stored values, it is similarly an indication of violation of sequentiality. Other more sophisticated tests can also be performed on these kinds of dynamic values.

Another class of authenticator variables that may be used in the process of FIG. 3 are environment variables that provide information about how the authenticator 18 is being used. These can include location information, client device type or identifier (e.g., serial number), network address information, browser type, time and date, etc. By storing and analyzing this information, the risk analyzer 30 builds a profile of authenticator use and can then assess whether a current use falls within or outside of the profile. Regarding location, for example, the authenticator 18 may normally be used only within a certain geographic region, so a use outside that region may indicate higher risk. Also, uses that are near in time but widely spaced in location might signify increased risk. If an authentication is being attempted from a previously unknown client device or browser type, or is being done at an unusual time or day, these can factor into an increased risk score.

There may be another aspect to a pattern of recent authentication operations that may signify increased risk, which is a set of failed attempts using authentication codes that are not in a range of currently expected codes based on the built-in sequentiality. In the case of a fraudster trying to guess at a personal identifier number (PIN), for example, the codes resulting from a number of incorrect guesses will generally have no relationship to the codes that are expected around a given time. Patterns of this type can also be detected by analysis of stored authenticator values. More generally, guessing behavior can be indicated when an attempted authentication has some element of correct data. For instance, the OTP may be correct but the PIN is incorrect, or the OTP is off by a certain number of minutes or event counts.

In the case of time-based OTP, another aspect that can be analyzed is the rate or velocity at which a time window used for authentication is increasing. Time windows are used to define ranges of acceptable values of dynamic variables in the face of normal offsets, and changes in time windows correspond to relative drift between the clocks used by the authenticator 18 and the authentication controller 28. This drift should be relatively constant even over a long period (e.g., weeks or months). As long as the drift is sufficiently small and substantially constant, this is interpreted as normal relative drift of a single legitimate authenticator 18 and so the authentication controller 28 simply makes periodic adjustments to the time offset used for authentication. However, if the offset should suddenly change by a large amount or its drift rate increase substantially, this may be an indication that a clone authenticator 18' is in use. These values can be calculated and stored, and the stored values used in the analysis performed at step 46.

It should be noted, and also clear from the above description, that in general there may be one or more authenticator variables that may be stored and used for risk analysis. Additionally, the risk analysis step 46 may be used in different ways. It may be performed during a current authentication operation which is to be subject to selective inhibition at step 48, or it may be performed apart from any current authentication operation and the results used in some later authentication operation. As an example, the analysis may be performed as part of an explicit security-related procedure that is conducted by the authentication system 12 periodically or on demand of a user such as a system administrator. In this respect it may have a forensic quality to it.

While various embodiments of the invention have been particularly shown and described, it will be understood by those skilled in the art that various changes in form and details may be made therein without departing from the scope of the invention as defined by the appended claims.

What is claimed is:

1. A method of operating a data processing system to respond to potential use of a clone authenticator capable of mimicking behavior of a legitimate authenticator known to an authentication system of the data processing system, comprising:

by the authentication system, engaging in a series of authentication operations, each authentication operation involving apparent use of the legitimate authenticator based on an authenticator identifier supplied to the authentication system therefor, each authentication operation including receiving and storing corresponding values of one or more authenticator variables that normally change in a known authenticator-specific way during the series of authentication operations; and by the authentication system, for each of the authentication operations as a current authentication operation:

applying a risk analysis function to the stored values of the authenticator variables to generate a risk indicator signal indicating a level of risk that the clone authenticator is in use, the risk analysis function including detection of an abnormal change of the authenticator variables during the series of authentication operations; and outputting the risk indicator signal to an access controller that operates, based on the level of risk indicated by the risk indicator signal, to selectively inhibit an otherwise successful current authentication operation involving apparent use of the legitimate authenticator, wherein each of the series of authentication operations is performed as part of a corresponding one of a series of separate accesses to a service provided by a service system of the data processing system, each authentication operation including a respective application of the risk analysis function and outputting of the risk indicator signal based on values of the authenticator variables received and stored over corresponding preceding authentication operations, and wherein the otherwise successful authentication operation selectively inhibited by the risk indicator signal is a most recent one of the series of authentication operations.

2. A method according to claim 1, wherein the authenticator variables include an authentication code generated by the authenticator using a secret value and a dynamic input variable.

3. A method according to claim 2, wherein the dynamic input variable as generated by the legitimate authenticator changes monotonically over an operating period spanning the series of authentication operations.

4. A method according to claim 3, wherein the dynamic input variable is time or an event count.

5. A method according to claim 4, wherein the risk analysis function includes calculating a velocity of change of a time and/or event window defining acceptable current authentication codes, and comparing the calculated velocity with a threshold velocity corresponding to a normal rate of change of the time and/or event window.

6. A method according to claim 4, wherein the risk analysis function includes examining an extent of failed authentication operations over an enlarged time and/or event window covering a longer period than a normal time and/or event window defining acceptable authentication codes.

7. A method according to claim 2, wherein the dynamic input variable as generated by the legitimate authenticator changes in a known sequential way over an operating period spanning the series of authentication operations.

8. A method according to claim 7, wherein the dynamic input variable is a response calculated by the authenticator based on a challenge presented to the authenticator by the authentication system during authentication operations.

9. A method according to claim 1, wherein the authenticator variables include an environmental variable not used in generating the authentication codes.

10. A method according to claim 9, wherein the environmental variable is a location variable indicating a geographic location of the authenticator, and wherein the risk analysis function is operative to check for authentication operations that are closely spaced in time and widely spaced in geographic location as indicated by values of the location variable.

11. A method according to claim 1, wherein the risk analysis function looks for a pattern of repeated failed authentication attempts indicative of guessing or brute-force behavior.

12. A method according to claim 1, wherein each authentication operation is augmented by transaction signing by which information specific to a current transaction is included and used by the risk analysis function in calculating the risk signal.

13. An authentication system usable in a data processing system and operable to respond to potential use of a clone authenticator capable of mimicking behavior of a legitimate authenticator known to the authentication system, comprising:

one or more server computers each including one or more processors, memory, input/output circuitry, and interconnect circuitry coupling the processors, memory and input/output circuitry together, the input/output circuitry to be used to couple the server computers to other components of the data processing system including a service system with which the authentication system is to engage in authentication operations; and program instructions stored in the memory of the server computers and executable by the processors of the server computers to constitute an authentication controller and a risk analyzer, the authentication controller and risk analyzer being co-operative to:

engage in a series of authentication operations, each authentication operation involving apparent use of the legitimate authenticator based on an authenticator identifier supplied to the authentication system therefor, each authentication operation including receiving and storing corresponding values of one or more authenticator variables that normally change in a known authenticator-specific way during the series of authentication operations; and for each of the authentication operations as a current authentication operation:

(1) apply a risk analysis function to the stored values of the authenticator variables to generate a risk indicator signal indicating a level of risk that the clone authenticator is in use, the risk analysis function including detection of an abnormal change of the authenticator variables during the series of authentication operations; and (2) output the risk indicator signal to an access controller that operates, based on the level of risk indicated by the risk indicator signal, to selectively inhibit an otherwise successful current authentication operation involving apparent use of the legitimate authenticator, wherein each of the series of authentication operations is performed as part of a corresponding one of a series of separate accesses to a service provided by a service system of the data processing system, each authentication operation including a respective application of the risk analysis function and outputting of the risk indicator signal based on values of the authenticator variables received and stored over corresponding preceding authentication operations, and wherein the otherwise successful authentication operation selectively inhibited by the risk indicator signal is a most recent one of the series of authentication operations.

14. An authentication system according to claim 13, wherein the authenticator variables include an authentication code generated by the authenticator using a secret value and a dynamic input variable.

15. An authentication system according to claim 14, wherein the dynamic input variable as generated by the legitimate authenticator changes monotonically over an operating period spanning the series of authentication operations.

16. An authentication system according to claim 15, wherein the dynamic input variable is time and/or an event count.

17. An authentication system according to claim 16, wherein the risk analysis function includes calculating a velocity of change of a time and/or event window defining acceptable current authentication codes, and comparing the calculated velocity with a threshold velocity corresponding to a normal rate of change of the time and/or event window.

18. An authentication system according to claim 16, wherein the risk analysis function includes examining an extent of failed authentication operations over an enlarged time and/or event window covering a longer period than a normal time and/or event window defining acceptable authentication codes.

19. An authentication system according to claim 14, wherein the dynamic input variable as generated by the legitimate authenticator changes in a known sequential way over an operating period spanning the series of authentication operations.

20. An authentication system according to claim 19, wherein the dynamic input variable is a response calculated by the authenticator based on a challenge presented to the authenticator by the authentication system during authentication operations.

21. An authentication system according to claim 13, wherein the authenticator variables include an environmental variable not used in generating the authentication codes.

22. An authentication system according to claim 21, wherein the environmental variable is a location variable indicating a geographic location of the authenticator, and wherein the risk analysis function is operative to check for authentication operations that are closely spaced in time and widely spaced in geographic location as indicated by values of the location variable.

23. An authentication system according to claim 13, wherein the risk analysis function looks for a pattern of repeated failed authentication attempts indicative of guessing or brute-force behavior.

24. An authentication system according to claim 13, wherein each authentication operation is augmented by transaction signing by which information specific to a current transaction is included and used by the risk analysis function in calculating the risk signal.

* * * * *